US006206999B1

(12) United States Patent
Ritto et al.

(10) Patent No.: US 6,206,999 B1
(45) **Date of Patent: *Mar. 27, 2001**

(54) METHOD OF MAKING A LIGHTWEIGHT SPEAKER ENCLOSURE

(75) Inventors: Ross Ritto, Encinitas; Michael Adams, Vista, both of CA (US)

(73) Assignee: Southern California Sound Image, Inc., Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,241

(22) Filed: May 10, 1999

Related U.S. Application Data

(63) Continuation of application No. 08/600,310, filed on Feb. 12, 1996, now Pat. No. 5,916,405, and a division of application No. 08/303,947, filed on Sep. 9, 1994, now Pat. No. 5,519,178.

(51) Int. Cl.[7] ..................... A47B 81/06; B32B 31/04

(52) U.S. Cl. ..................... 156/245; 156/285; 181/199; 264/258

(58) Field of Search ..................... 156/245, 285, 156/286, 307.3; 264/257, 258; 181/148, 151, 199, 290, 292

(56) References Cited

U.S. PATENT DOCUMENTS

| | | | |
|---|---|---|---|
| 1,965,830 | 7/1934 | Hammer . | |
| 2,670,053 | 2/1954 | Doms . | |
| 3,804,195 | 4/1974 | Everitt et al. . | |
| 3,985,201 | 10/1976 | Kloster . | |
| 4,042,778 | 8/1977 | Clinton . | |
| 4,071,111 | 1/1978 | Croup . | |
| 4,109,983 | 8/1978 | Konoshita . | |
| 4,284,168 | 8/1981 | Gaus . | |
| 4,596,305 | 6/1986 | Jagborn . | |
| 4,811,403 | 3/1989 | Henricksen et al. . | |
| 4,905,860 | 3/1990 | Kurihara . | |
| 4,957,184 | 9/1990 | Negishi . | |
| 4,964,482 | 10/1990 | Meyer . | |
| 5,067,583 | 11/1991 | Hathaway . | |
| 5,168,129 | 12/1992 | D'Antonio . | |
| 5,916,405 * | 6/1999 | Ritto et al. ........................... | 156/245 |

FOREIGN PATENT DOCUMENTS 191995 10/1984 (JP) .

* cited by examiner

*Primary Examiner*—Jeff H. Aftergut
(74) *Attorney, Agent, or Firm*—Knobbe, Martens, Olson & Bear, LLP

(57) ABSTRACT

A speaker enclosure having a substantially seamless rigid outer skin, a middle sound absorbing layer, and a substantially seamless flexible inner skin. The speaker enclosure is comprised of two basic parts, a box section and a baffle section where each of these sections include the rigid outer skin, the middle sound absorbing layer and the seamless flexible inner skin and are made according to the same method. The outer skin is formed from multiple layers of resin impregnated carbon fiber, the middle sound absorbing layer includes pieces of honeycomb material and the inner layer is formed from multiple layers of resin impregnated fiberglass. The layers of material are arranged in a substantially seamless manner into a mold and then cured by vacuum bagging and heating thereby producing a strong, lightweight speaker enclosure made of materials which dampen the transmission of errant sound waves in the enclosure and thereby minimize distortion of the sound signal produced by the speaker.

22 Claims, 5 Drawing Sheets

METHOD OF MAKING A LIGHTWEIGHT SPEAKER ENCLOSURE

This application is a continuation of U.S. patent application Ser. No. 08/600,310, filed Feb. 12, 1996, now U.S. Pat. No. 5,916,405, which was a divisional application of U.S. patent application Ser. No. 08/303,947 filed Sep. 9, 1994, now U.S. Pat. No. 5,519,178, issued May 21, 1996.

BACKGROUND OF THE INVENTION

1. Field of the Invention

The present invention relates to an improved speaker enclosure and, in particular, concerns a speaker enclosure seamlessly manufactured out of lightweight, sound absorbing materials.

2. Description of the Related Art

Speaker enclosures of the prior art are typically made out of a semi-rigid material, such as plywood, and have a box-like shape. The front side of the speaker enclosure includes a baffle which has several openings in which the diaphragm portion of the speaker is positioned so that sound can emanate out from the speaker enclosure. This describes the typical speaker enclosure that is used in many different applications including speakers for home use and speakers for use at music concerts.

One difficulty that occurs in many large prior art speaker enclosures is that they are very heavy. In particular, the large speakers that are used, for example, in music concerts require large speaker enclosures. Generally, the enclosures have to be made out of fairly thick material to support the weight of the speakers. Consequently, speaker enclosures can become very heavy. As can be appreciated, the heavier the speaker enclosure, the more difficult it is to move and support the speaker enclosure. In some instances, the increased weight results in difficulties in mounting these enclosures.

For example, it is often desirable to mount speakers over the heads of the performers and audience at musical concerts. However, heavy speaker enclosures pose a risk of the speaker enclosures breaking loose from their supports and falling on the performers or the audience. To minimize this risk, heavy duty supports are needed to securely retain the speaker enclosures. It can be appreciated, however, that these supports increase the cost of installing the speaker enclosures and can also increase the time required to mount the enclosures.

A further difficulty that results from constructing speaker enclosures out of materials such as plywood is that these materials often degrade the sound performance of the speaker. Ideally, all of the sound that is produced by the speaker should emanate outward from the diaphragm of the speaker away from the speaker enclosure. However, there are typically some errant sound waves which travel inward into the speaker enclosure.

A semi-rigid material, such as plywood, has a tendency to vibrate in response to these inwardly travelling errant sound waves. These vibrations can result in distortion of the sound produced by the speakers. To minimize these vibrations, sound engineers often have to place materials inside of the speaker enclosure to dampen the errant sound waves and minimize the vibrations. However, the speaker enclosures are typically configured so as to maximize the output of the speakers and placing extraneous materials and objects inside the speaker enclosures can further result in degradation of the sound performance of speaker.

To address these problems, some speaker enclosure designers have built enclosures for speakers out of materials that are lightweight and could, conceivably, absorb some errant sound waves. One example of such an enclosure is shown in U.S. Pat. No. 3,804,195 which discloses a loudspeaker enclosure made out of corrugated sheets of material. The corrugated sheets of material include hollow portions. Each of these sheets are joined to each other in a box-like configuration. Another example is U.S. Pat. No. 4,811,403 which discloses a lightweight loudspeaker enclosure that uses a rigid. lightweight honeycombed material in part of the speaker enclosure.

While the weight characteristics and sound performance of the speaker enclosure disclosed in the U.S. Pat. No. 3,804,195 patent and the U.S. Pat. No. 4,811,403 patent may be improved by the use of the corrugated material, there will still be vibrations of the speaker enclosure due to the fact that there are seams which join each of the pieces of the enclosure. The errant sound waves induce vibrations at the seams and joints between the individual materials and thereby reduce the overall sound performance or efficiency of the speakers. Further, the enclosures disclosed in both these patents still have some surfaces and materials which vibrate in response to errant sound waves and thereby reduce the overall efficiency and sound performance of the speakers.

Hence, there is a need in the art for a lightweight speaker enclosure which minimizes distortion of the sound signal produced by the speakers as a result of errant sound waves in the speaker enclosure. To this end, there is a need for a speaker enclosure that is made out of a composite of strong lightweight materials that have sound absorbing qualities. Further, this speaker enclosure should also be as seamless as possible to minimize the sources of distortion of the sound signals.

SUMMARY OF THE INVENTION

The aforementioned needs are satisfied by the sound speaker enclosure of the present invention which generally includes a box section formed of an outer skin of a rigid material, a middle layer of a sound absorbing material, and an inner skin of a flexible material and a baffle section that includes the same three layer construction. The baffle section is then preferably bonded to the box section of the speaker enclosure to thereby complete the speaker enclosure. In one aspect of the present invention, the box section and the baffle section of the speaker enclosure are constructed so that there are virtually no seams between different walls of the enclosure. In the preferred embodiment this is accomplished by individually constructing the box and baffle section of the speaker enclosure out of generally flexible overlapping pieces of material that are then cured into a rigid or semi-rigid state. Once both the box and baffle section of the speaker enclosure are constructed, they are then bonded to each other in a virtually seamless bond.

In another aspect of the present invention, the rigid outer skin of the speaker enclosure is made out of a material that, when cured, is very hard. This hard outer skin minimizes the likelihood of the enclosure vibrating due to errant sound waves. In the preferred embodiment, the rigid outer skin is made of overlapping layers of a carbon fiber material.

In yet another aspect of the present invention, the middle layer includes air pockets which are designed to trap the errant sound waves in the interior of the speaker enclosure to prevent their reflection and retransmission. In the preferred embodiment, the middle layer is made of pieces of honeycomb material sold under the trademark Nomex that includes air pockets which can absorb sound waves.

In yet another aspect of the present invention, the inner flexible skin is made of a skin that is sufficiently flexible to absorb, and not reflect, the errant sound waves. In the preferred embodiment, the inner flexible skin is made of overlapping layers of fiberglass that are cured into a hardened, yet flexible, state.

Thus, the present invention discloses a sound speaker enclosure which has a box section and a baffle section where both sections are virtually seamless, are manufactured out of lightweight yet strong materials and are designed to maximize the performance of the sound speakers by minimizing both retransmission of errant sound waves and vibrations resulting from these errant sound waves. These and other objects and features of the present invention will become more fully apparent from the following description and appended claims taken in conjunction with the accompanying drawings.

DESCRIPTION OF THE PREFERRED EMBODIMENTS

Figure 1:
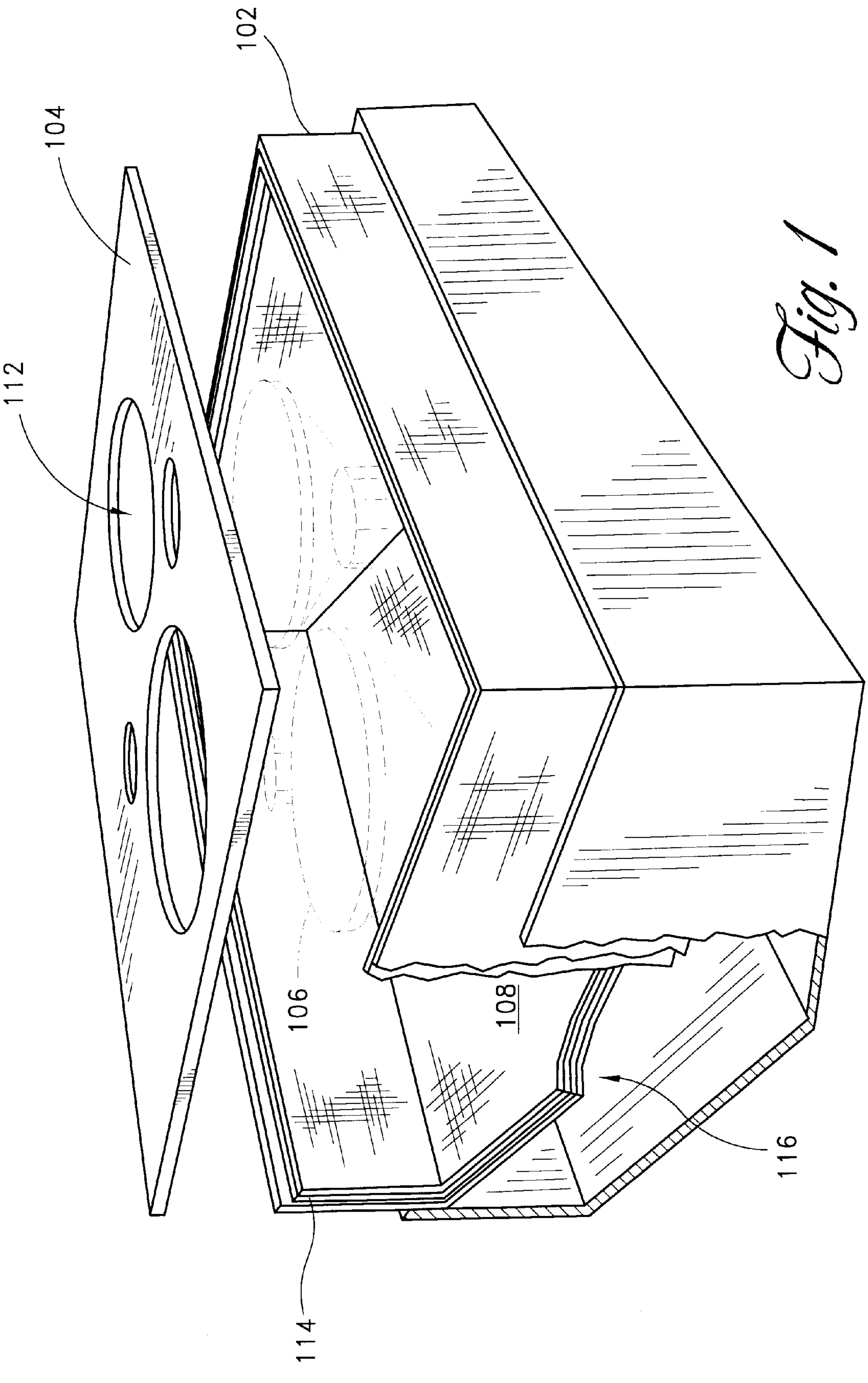
FIG. 1 is a perspective view of the speaker enclosure of the present invention which is partially cut away to illustrate the layers of material comprising the walls of the speaker enclosure.

Reference will now be made to the drawings wherein like numerals refer to like parts. FIG. 1 illustrates a speaker enclosure 100 of the present invention. The speaker enclosure 100 in this preferred embodiment is comprised of two basic component parts, a box section 102 and a baffle section 104. The box section 102 defines a volume of enclosed space in which one or more speakers 106 (shown in phantom) are positioned. In the embodiment of the speaker enclosure 100 shown in FIG. 1, the box section 102 is shown to have a generally rectangular shape with two back walls 108 that are flanged outwardly from a front face 110 of the box section 102.

The baffle section 104 includes one or more openings 112 where the speakers 106 are mounted so that the diaphragm portion of the speakers communicate through the openings 112 to the outside of the speaker enclosure 100. The baffle section 104 is dimensioned to rest on a ledge 114 which extends around the inside perimeter of the front face 110 of the box section 102 of the enclosure 100. In this preferred embodiment, the ledge 114 is preferably dimensioned to allow the baffle section 104 to rest flush with front face 110 of the box section 102. The ledge 114 is also preferably made of a material such as styrofoam which provides a surface whereby the baffle section 104 can be securely bonded to the box section 102.

It should be appreciated that the speaker enclosure 100 can be any of a number of shapes and sizes depending upon the desired use of the speaker enclosure. Hence, the following description of the construction of the speaker enclosure 100 of the present invention is readily adaptable to any size and shape of speaker enclosure and is not limited to the exact enclosure shown in these figures.

The cut away section of FIG. 1 also illustrates that the walls of the box section. 102 are comprised of a plurality of layers of material generally indicated by the reference numeral 116. The speaker enclosure 100 of the present invention is advantageously constructed of a plurality of layers of materials which are positioned in a mold 120 in a. layered fashion and then cured in the manner described below. The mold 120 is, in this preferred embodiment, a female wood mold which has the exact dimensions and configuration as the outside of the box section 102 of speaker enclosure 100. The mold 120 is hand made to the exact tolerances desired and then sanded to allow for easy removal of the box section 102 after fabrication.

Figure 2:
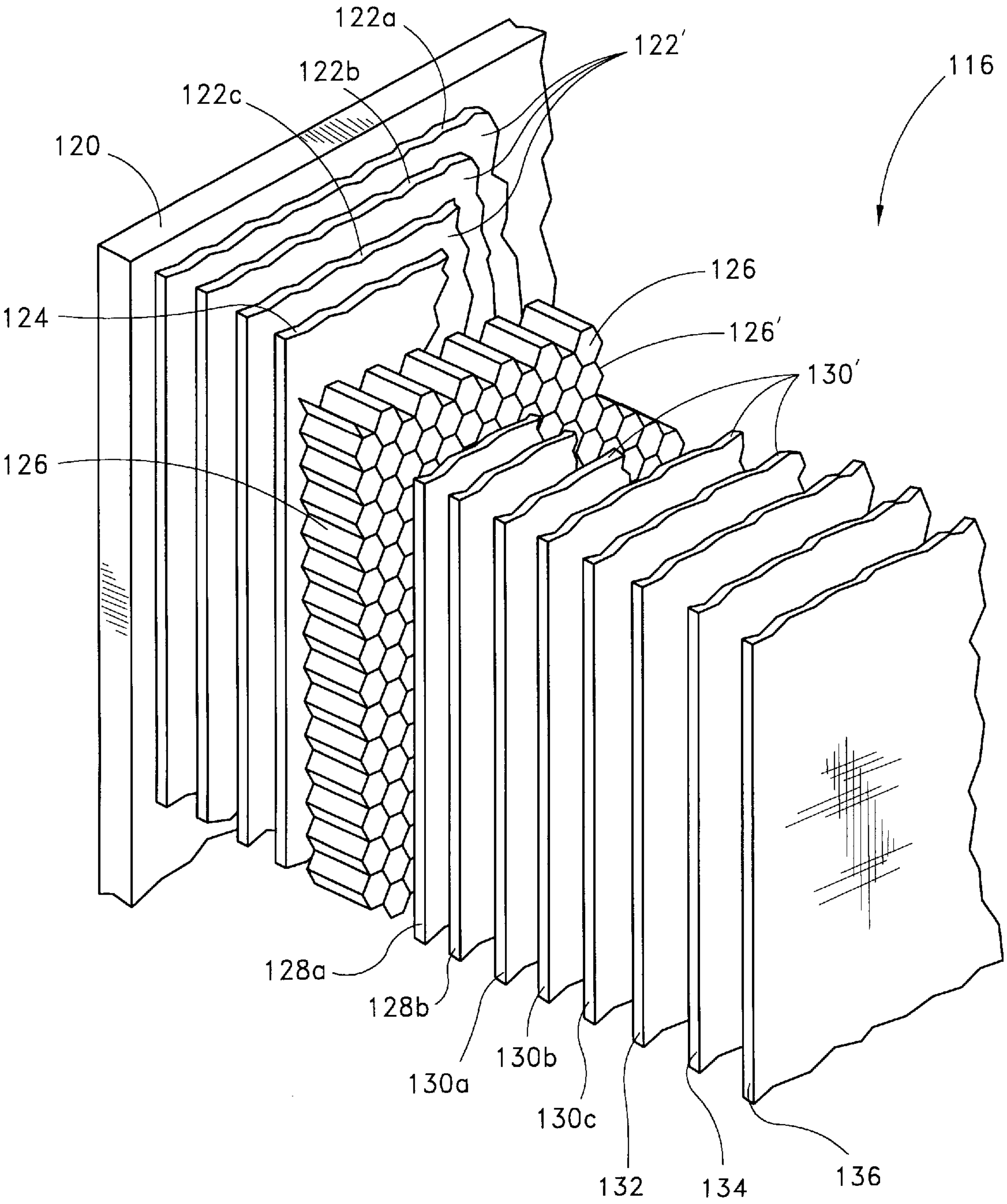
FIG. 2 is an exploded perspective view of a section of one of the walls of the speaker enclosure of FIG. 1 which illustrates the layers of the speaker enclosure in greater detail.

The layers that are positioned in the mold 120 to produce the walls of the box section 102 of the sound enclosure 100 will now be described by reference to FIG. 2. FIG. 2 is an exploded perspective view of the of the layers 116 that comprise both the walls of the box section 102 of the enclosure 100 and the wall of the baffle section 104. These layers 116 are positioned in the mold 120 and are then vacuum bagged and cured using conventional techniques that are described in greater detail below.

Generally, the mold 120 is initially coated with one or more release agents to permit easy removal of the speaker enclosure 100 from the mold 120 once the layers 116 have been cured. In this preferred embodiment, the inner surface of the mold 120 is thoroughly coated with three coats of FREAKOUT 700-NC release agent manufactured by Freakout Co. of Seabrook, N.H., three coats of PA0801 Flourotelomer Wax Dispersion manufactured by PTM & W Industries of Santa Fe Springs, Calif. and one coat of E-91 N-ODS monocoat material manufactured by Chem Trend Inc. of Howell, Mich.

Figure 3:
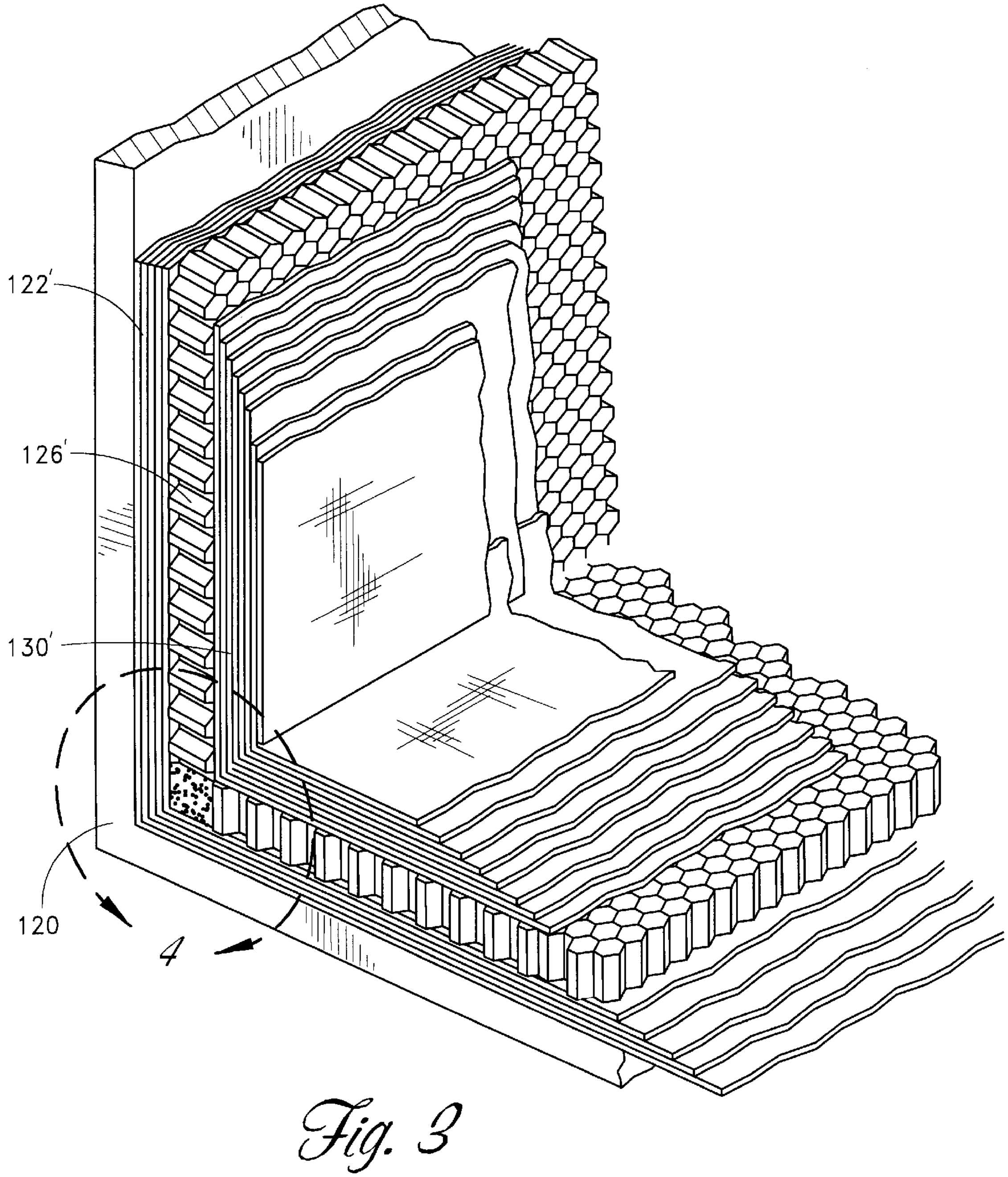
FIG. 3 is a partial perspective view of a section of two of the walls of the speaker enclosure, taken along lines 3—3 of FIG. 1, which further illustrates the organization of the layers of material forming the walls of the speaker enclosure.
Figure 4:
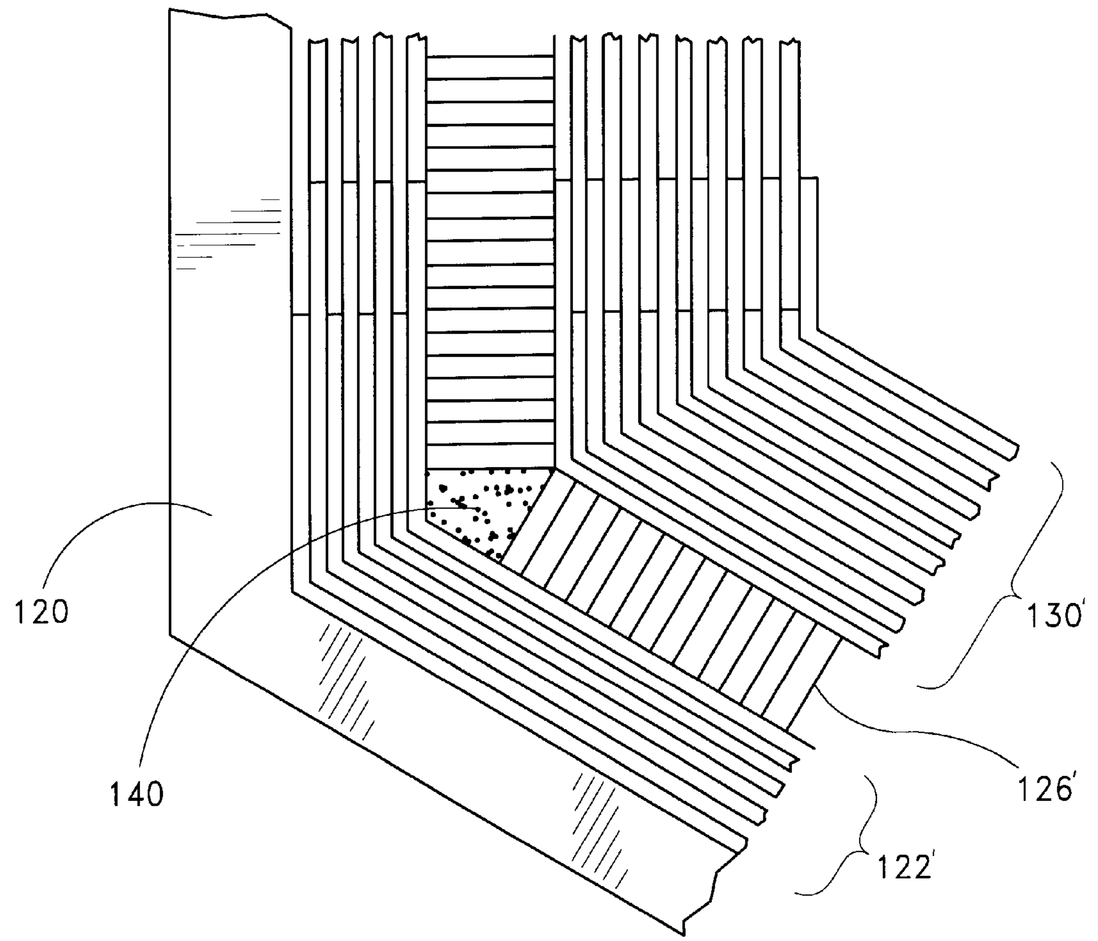
FIG. 4 is a exploded side view of a circled section of two of the walls of the speaker enclosure shown in FIG. 3 which further illustrate the organization of the layers of material forming the walls of the speaker enclosure.

Once the release agent is applied to the mold 120, the first of the layers 116 is then positioned inside of the mold 120. Specifically, three layers of flexible material **122*a*, 122*b* and 122*c* that cures into a hardened material are positioned inside of the mold. In this preferred embodiment, the material 122 is a carbon fiber material that is a flexible cloth material impregnated with resin. Each layer of material 122 is comprised of a plurality of pieces of the fabric that are cut and then positioned inside of the mold 120. The plurality of pieces are cut to size to fit the various walls of the box enclosure 102 or the baffle section 104 and these layers 116 are preferably cut so as to overlap at the borders between two walls of the box section 102 as is shown in greater detail in FIGS. 3 and 4**.

Preferably, the carbon fiber layers **122*a*, 122*b* and 122*c* are made of three alternating weaves of carbon fiber to provide additional strength to the outer surface of the box 102 once the layers 116 have cured. Specifically, in this preferred embodiment, the three carbon layers 122*a*–122*c*** are comprised of a layer having a 0/90 weave, a layer having a +/−45 weave and a layer having a 0/90 weave respectively. Further, in this preferred embodiment, each of these layers 122 are preferably comprised of series 282 Carbon Fiber Prepreg cloth with a 40% resin content wherein the resin cures at 250° F. Carbon fiber meeting these requirements is available from JD Lincoln Co. in Costa Mesa, Calif.

Once each of the layers 122 are positioned in the mold 120, and a layer of film adhesive 124 is then positioned over the layer of carbon fiber 122*c*. The layer of film adhesive 124 is comprised of a thin layer of cloth that contains resin which allows pieces of a sound absorbing material 126 to adhere to the carbon fibers 122 upon curing.

Once the layer of film adhesive 124 is positioned inside of the mold 120, a plurality of pre-cut pieces of sound absorbing material 126 are then positioned inside of the mold 120 on top of the film adhesive 124. Preferably, the sound absorbing material 126 is comprised of a material which defines a plurality of air pockets that are capable of absorbing sound waves produced by the speaker 106. In this preferred embodiment, the sound absorbing material 126 is comprised of Nomex brand material. Nomex is a brand name of a material manufactured by Dupont that is essentially comprised of a paper base impregnated with resin, to give rigidity to the material, that forms a plurality of open cells. In this preferred embodiment, Nomex brand material having a 4.8 pound density with ¼" cells and that is available as AHN 4120 Nomex Honeycomb from Advanced Honeycomb Inc. of San Marcos, Calif., is used.

In this preferred embodiment, the sound absorbing material 126 is rigid so it can't be laid into the mold 120 in an overlapping fashion. Hence, the sound absorbing material 126 has to be cut into a plurality of pieces which are preferably configured so that as much as possible of the surface of the inner walls of the box section 102 is covered with the sound absorbing material 126. As can be appreciated, the exact dimensions of the pieces of sound absorbing materials 126 depend upon the configuration of the speaker enclosure 100, which can vary depending upon the desired shape and use of the enclosure.

Once the plurality of pieces of sound absorbing material 126 have been positioned in the mold 120, pieces of film adhesive, forming two layers of film adhesive 128*a* and 128*b* are then positioned on top of the layer of sound absorbing material 126. The layers of film adhesive 126 bond the sound absorbing material 126 to three layers of flexible material 130*a*–130*c*. The three layers of flexible material 130*a*–130*c*, in this preferred embodiment, are comprised of schedule 7781 E-glass which is a type of fiberglass. Preferably, the flexible material 130 used in the present invention is flexible and can be laid on the layer of film adhesive 128 in the same manner as a layer of cloth. Hence, pieces of the material 130 are cut to fit each section of the walls of the enclosure 100. Preferably, these layers are cut so that, at the intersection between two walls, there is an overlap of the material 130.

A layer of release fabric 132, a layer of perforated release film 134 and a layer of air weave material 136 are then preferably positioned on top of the layers of the flexible semi-rigid material 130. The layer of release film 134 and air weave material 136 are preferably positioned over the front face 110 of the box section 102 of the enclosure 100 and are firmly attached at their periphery to the mold 120. These layers allow excess resins and volatiles to escape from the layers of carbon, sound absorbing material and E-glass upon curing of the box section 102 of the enclosure 100.

Once each of these layers is positioned inside the mold 120, a vacuum bag (not shown) is positioned on top of the mold 120 to thereby allow the resins and layers of material to cure by vacuum bagging in a manner well known in the art. Specifically, in the preferred embodiment of the present invention, an assembled mold comprising the mold 120 with the layers 116 is vacuum cured over a given temperature range for approximately 2 hours at −85 kPa, −25 in Hg pressure. Preferably, the assembled mold is initially positioned in an oven which is heated to approximately 140–160° F. Once the assembled mold attains this temperature, the oven is then heated to 250° F. at a rate of approximately 1° per minute. The assembled mold then cures at this temperature for 2 hours after which the oven cools at a rate no faster than 4° F. per minute.

The curing process results in curing and hardening of the resins contained in the carbon fiber layers 122, the film adhesive layers 124 and 128 and the layers of flexible material 130. Consequently, after the curing process, the walls of the enclosure 100 are then comprised of three basic layers of material, a rigid outer skin 122', a layer of sound absorbing material 126' and a flexible inner skin 130'.

The rigid outer skin 122' is comprised of the three hardened layers of carbon fiber 122*a*–122*c*. Preferably the rigid outer skin 122' is sufficiently strong so as to both minimize the tendency of the box section 102 of the enclosure 100 to vibrate in response to errant sound waves produced by the speaker 106 and to prevent the escape of these sound waves through the walls of the box section 102 of the enclosure. As can be appreciated, the rigid outer skin 122' can be made of a number of different materials that will cure into a hardened rigid material including other carbon materials, Kevlar etc.

The flexible inner skin 130' is thus comprised of the three cured layers of fiberglass 130*a*–130*c*. The inner skin 130' is preferably sufficiently flexible to vibrate in response to the errant sound waves inside the speaker enclosure 100 and thereby absorb and not reflect these sound waves. As can be appreciated, the inner flexible skin 130' can be made of any material which has sufficient flexibility upon final assembly of the enclosure 100 to minimize reflection of these errant sound waves. Since the pieces of material forming the rigid outer skin 122' and the flexible inner skin 130' overlap at the junction between the walls, the box portion 102 of the enclosure is formed with virtually no seams between walls. This overlapping of the layers of material is more clearly illustrated in FIGS. 3 and 4. In both FIGS. 3 and 4, junctions between two walls of the mold 120, and thus junctions between two walls of the box section 102 of the enclosure, have overlapping layers of the carbon fiber 122 and the fiberglass 130. Further, the excess resins in the various layers 116 seep into the spaces 140 between the pieces of sound absorbing material 126 forming the sound absorbing material layer 126'. Consequently, the layer of sound absorbing material 126' is also a substantially continuous, seamless layer throughout entire box section 102 of the enclosure 100.

The seamless nature of the box section 102 of the enclosure 100 ensures that one wall of the box section 102 of the enclosure does not flex relative to another wall of the enclosure 100 as a result of errant sound waves impinging upon the walls. This results in less vibration of the enclosure 100 and minimizes the amount of errant sound waves escaping from the back and sides of the enclosure 100. Consequently, there is less distortion of the sound signal generated from the speakers 106 mounted in the speaker enclosure 100 of the present invention.

Furthermore, the structure of the walls of the box, i.e., being comprised of a rigid outer skin 126', a layer of sound absorbing material 126' and an flexible inner skin 130' also results in less distortion of the sound signal produced by the speakers 106. Specifically, the rigid outer skin 122' in this preferred embodiment is significantly more rigid than other materials used in the construction of speaker enclosure such as plywood. Consequently, the speaker enclosure 100 as a whole does not vibrate in response to errant sound waves to the degree that a prior art speaker enclosure made of plywood.

However, the inner layer of flexible inner skin 130' acts so as to absorb errant sound waves by flexing in response to the errant sound waves. Further, the middle sound absorbing layer 126' acts as a chamber, in a manner analogous to the chamber created by double wall construction in sound studios, to trap the sound waves absorbed by the flexible inner skin 130'.

Figure 5:
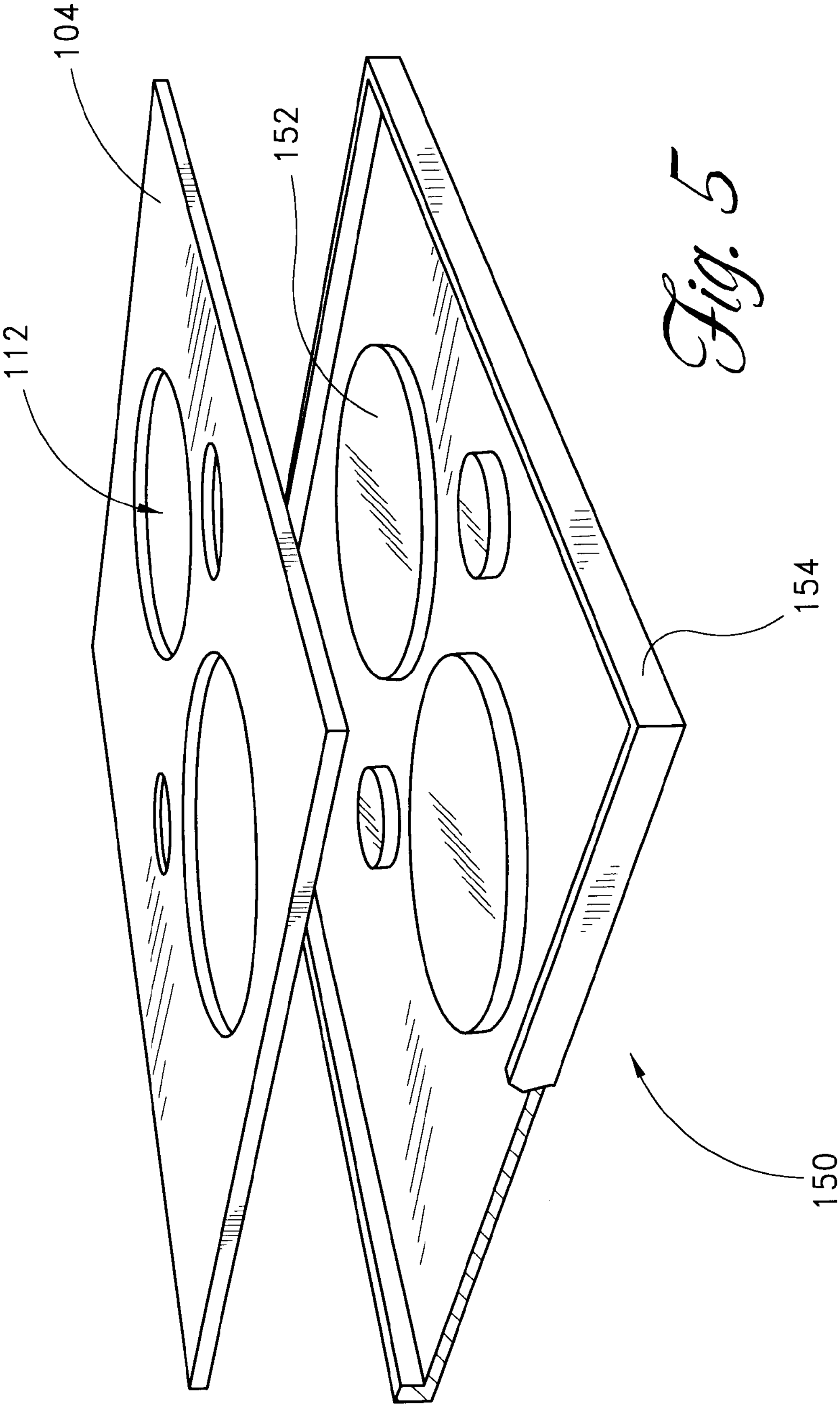
FIG. 5 is a perspective view of a male mold used to fabricate the baffle section of the speaker enclosure shown in FIG. 1.

The foregoing description has presented a method of fabricating the box section 102 of the speaker enclosure 100. In this preferred embodiment, the baffle section 104 is also fabricated using a suitable male mold and according to the above-described method with the above-described materials. Referring now to FIG. 5, a sample male mold 150 used to fabricate the baffle section 104 is shown. The mold 150 includes a plurality of raised surfaces 152 at the position of the openings 110 in the baffle section 104. Further, the mold 150 has a lip 154 around the perimeter of the mold 150 which projects outward from the surface of the mold 150 a distance sufficient to retain the layers 116 inside of the mold 150 during fabrication. As can be appreciated, the exact shape and configuration of the mold 150 and the pieces of materials forming the layers 116 depends upon the desired shape and configuration of the baffle section 104.

Hence, in this preferred embodiment, the baffle section 104 is fabricated from cut overlapping pieces of carbon fiber 122 forming the original outer skin 122', cut pieces of sound absorbing material 126 forming the middle sound absorbing layer 126' and cut overlapping pieces of fiberglass 130 forming the inner flexible skin 130' in the same manner as the box section 102 described above. Consequently, the baffle section 104 is preferably made of the same materials as the box section 102 and, thus, has the same advantages in weight and strength and absorption of the errant sound waves.

Thus, the enclosure 100 of the present invention is comprised of a seamless box section 102 and a baffle section 104 that have the above-described sound absorbing capabilities. The only seam in the entire enclosure 100 is the seam between the box section 102 and the baffle section 104. As described above in reference to FIG. 1, the baffle section 104 preferably is flushly positioned on the ledge 114 in the box section 102. In this preferred embodiment, the ledge 114 is formed from pieces of Klegicell brand foam manufactured by Barracuda Technologies Inc. of Desoto, Tex. which are bonded to the perimeter of the front face 110 of the box section 102 and also to the baffle section 104 of the enclosure 100. In this preferred embodiment the foam ledge 114 is bonded to both the box section 102 and the baffle section 104 of the enclosure using RF 912/130 two part epoxy from Resin Formulators Co. of Culver City, Calif.

Thus, the present invention described herein comprises a sound speaker enclosure which is virtually seamless and is made of sound absorbing materials. Further, the materials used in the preferred embodiment of the speaker enclosure 100 described herein result in a speaker enclosure 100 that is significantly lighter yet stronger than comparably sized prior art speaker enclosures. Hence, the speaker enclosures of the present invention can be more readily mounted and supported in different positions than the heavier speaker enclosures of the prior art.

Although the foregoing description of the preferred embodiment of the present invention has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit of the present invention. Consequently, the scope of the invention should not be limited to the foregoing discussion, but should be defined by the appended claims.

What is claimed is:

1. A method of manufacturing a speaker enclosure comprising the steps of:

positioning a first resin impregnated material into a female mold configured to form a box section of said speaker enclosure so that said first resin impregnated material forms a continuous substantially seamless layer of said first material;

positioning a sound absorbing material in said female mold on top of said seamless layer of said first material;

positioning a second resin impregnated material in said female mold on top of said sound absorbing material so that said second resin impregnated material forms a continuous substantially seamless layer of said second material;

curing said box section of said speaker enclosure so that said first layer of material forms a substantially seamless rigid outer skin of said speaker enclosure, and said second layer of material forms a substantially seamless flexible inner skin of said material with said layer of sound absorbing material interposed therebetween; and attaching a baffle section to said box section which is formed after said curing step, wherein said baffle section includes an opening for a diaphragm of a speaker positioned inside said speaker enclosure defined by said box section and said baffle section.

2. The method of claim 1, wherein said step of positioning a first resin impregnated material into a female mold comprises the steps of:

coating said mold with one or more release agents; and positioning pieces of resin impregnated carbon fiber into said mold so that there are three layers of resin impregnated carbon fiber in said mold and wherein said three layers of resin impregnated carbon fibers respectively have weaves of 0/90, +/−45 and 0/90.

3. The method of claim 2, wherein the step of positioning a sound absorbing material in said female mold comprises the steps of:

positioning a layer of film adhesive on the top layer of said layers of carbon fiber; and positioning a plurality of pieces of honeycomb material on said layer of film adhesive.

4. The method of claim 3, wherein said honeycomb material comprises cells of approximately ¼" in cross section and has a density of approximately 4.8 Lbs.

5. The method of claim 3, wherein the step of positioning a second resin impregnated material into said female mold comprises the steps of:

positioning one or more layers of film adhesive onto said layer of sound absorbing material; and positioning a plurality of pieces of resin impregnated fiberglass onto said layers of film adhesive such that said plurality of resin impregnated fiberglass pieces are arranged into a plurality of substantially seamless layers of resin impregnated fiberglass.

6. The method of claim 5, wherein said plurality of pieces of resin impregnated fiberglass are comprised of schedule 7781 E-glass.

7. The method of claim 5, wherein said step of curing said box section comprises the steps of:

positioning a layer of release fabric in said mold containing said layers of carbon fiber, sound absorbing material and fiberglass;

positioning a layer of release film over said layer of release fabric;

positioning a layer of air weave over said layer of release film;

vacuum bagging said mold containing said layers of carbon fiber, sound absorbing material and fiberglass; and heating said mold containing said layers of carbon fiber, sound absorbing material and fiberglass.

8. The method of claim 7, wherein the step of heating said mold comprises the steps of:

pre-heating an oven to a temperature in the range of about 140 to 160 degrees Fahrenheit;

positioning said mold into said oven;

increasing said temperature in said oven to approximately 250 degrees Fahrenheit at a rate of increase of no more than about 1 degree per minute;

heating said mold in said oven at a temperature of 250 degrees Fahrenheit for approximately 2 hours; and cooling said mold to room temperature at a cooling rate of no more than about 4 degrees Fahrenheit per minute.

9. The method of claim 8, wherein the resin in said resin impregnated carbon fiber and in said fiberglass cures at about 250 degrees Fahrenheit.

10. The method of claim 1, further comprising the step of manufacturing said baffle section, wherein said manufacturing step comprises the steps of:

positioning a first resin impregnated material into a male mold configured to form a baffle section of said speaker enclosure so that said first resin impregnated material forms a continuous substantially seamless layer of said first material;

positioning a sound absorbing material in said male mold on top of said substantially seamless layer of said first material;

positioning a second resin impregnated material into said male mold on top of said sound absorbing material so that said second resin impregnated material forms a continuous substantially seamless layer of said second material;

curing said baffle section of said speaker enclosure so that said first layer of material forms a substantially seamless rigid outer skin of said baffle section of said speaker enclosure, and said second layer of material forms a substantially seamless flexible inner skin of said material.

11. The method of claim 10, wherein said baffle section is bonded to a front face of said box section.

12. A method of manufacturing a speaker enclosure comprising the steps of:

positioning pieces of a first resin impregnated material into a female mold configured to form a box section of said speaker enclosure so that said pieces of said first resin impregnated material overlap to form a continuous substantially seamless layer of said first material;

positioning a sound absorbing material in said female mold on top of said seamless layer of said first material;

positioning pieces of a second resin impregnated material in said female mold on top of said sound absorbing material so that said pieces of said second resin impregnated material overlap to form a continuous substantially seamless layer of said second material;

curing said box section of said speaker enclosure so that said first layer of material forms a substantially seamless rigid outer skin of said speaker enclosure, and said second layer of material forms a substantially seamless flexible inner skin of said material with said layer of sound absorbing material interposed therebetween; and attaching a baffle section to said box section which is formed after said curing step, wherein said baffle section includes an opening for a diaphragm of a speaker positioned inside said speaker enclosure defined by said box section and said baffle section.

13. The method of claim 12, wherein said step of positioning a first resin impregnated material into a female mold comprises the steps of:

coating said mold with one or more release agents; and positioning pieces of resin impregnated carbon fiber into said mold so that there are three layers of resin impregnated carbon fiber in said mold and wherein said three layers of resin impregnated carbon fibers respectively have weaves of 0/90, +/−45 and 0/90.

14. The method of claim 12, wherein the step of positioning a sound absorbing material in said female mold comprises the steps of:

positioning a layer of film adhesive on the top layer of said layers of carbon fiber; and positioning a plurality of pieces of honeycomb material on said layer of film adhesive.

15. The method of claim 14, wherein said honeycomb material comprises cells of approximately ¼" in cross section and has a density of approximately 4.8 Lbs.

16. The method of claim 15, wherein the step of positioning a second resin impregnated material into said female mold comprises the steps of:

positioning one or more layers of film adhesive onto said layer of sound absorbing material; and positioning a plurality of pieces of resin impregnated fiberglass onto said layers of film adhesive such that said plurality of resin impregnated fiberglass pieces are arranged into a plurality of substantially seamless layers of resin impregnated fiberglass.

17. The method of claim 16, wherein said plurality of pieces of resin impregnated fiberglass are comprised of schedule 7781 E-glass.

18. The method of claim 17, wherein said step of curing said box section comprises the steps of:

positioning a layer of release fabric in said mold containing said layers of carbon fiber, sound absorbing material and fiberglass;

positioning a layer of release film over said layer of release fabric;

positioning a layer of air weave over said layer of release film;

vacuum bagging said mold containing said layers of carbon fiber, sound absorbing material and fiberglass; and heating said mold containing said layers of carbon fiber, sound absorbing material and fiberglass.

19. The method of claim 18, wherein the step of heating said mold comprises the steps of:

pre-heating an oven to a temperature in the range of about 140 to 160 degrees Fahrenheit;

positioning said mold into said oven;

increasing said temperature in said oven to approximately 250 degrees Fahrenheit at a rate of increase of no more than about 1 degree per minute;

heating said mold in said oven at a temperature of 250 degrees Fahrenheit for approximately 2 hours; and cooling said mold to room temperature at a cooling rate of no more than about 4 degrees Fahrenheit per minute.

20. The method of claim 19, wherein the resin in said resin impregnated carbon fiber and in said fiberglass cures at about 250 degrees Fahrenheit.

21. The method of claim 11, further comprising the step of manufacturing said baffle section, wherein said manufacturing step comprises the steps of:

positioning a first resin impregnated material into a male mold configured to form a baffle section of said speaker enclosure so that said first resin impregnated material forms a continuous substantially seamless layer of said first material;

positioning a sound absorbing material in said male mold on top of said substantially seamless layer of said first material;

positioning a second resin impregnated material into said male mold on top of said sound absorbing material so that said second resin impregnated material forms a continuous substantially seamless layer of said second material;

curing said baffle section of said speaker enclosure so that said first layer of material forms a substantially seamless rigid outer skin of said baffle section of said speaker enclosure, and said second layer of material forms a substantially seamless flexible inner skin of said material.

22. The method of claim 21, wherein said baffle section is bonded to a front face of said box section.

* * * * *